United States Patent
Gentile et al.

(10) Patent No.: US 9,008,929 B1
(45) Date of Patent: Apr. 14, 2015

(54) METHOD FOR CONTROLLING A POWERTRAIN AND A TRANSMISSION SYSTEM

(71) Applicant: GM Global Technology Operations LLC, Detroit, MI (US)

(72) Inventors: Martin Gentile, Hessen (DE); Armin Mueller, Hessen (DE)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 14/038,092

(22) Filed: Sep. 26, 2013

(51) Int. Cl.
*B60W 10/02* (2006.01)
*B60W 10/06* (2006.01)
*B60W 10/10* (2012.01)
*F16H 61/00* (2006.01)
*B60W 10/11* (2012.01)

(52) U.S. Cl.
CPC ............... *F16H 61/00* (2013.01); *B60W 10/11* (2013.01)

(58) Field of Classification Search
USPC ........ 701/54, 61, 67, 68; 477/77, 79, 83, 107, 477/111, 115, 178, 180, 181
See application file for complete search history.

(56) References Cited

U.S. PATENT DOCUMENTS

| | | | |
|---|---|---|---|
| 8,249,768 B2 * | 8/2012 | Mori et al. ..................... | 701/22 |
| 2008/0255738 A1 * | 10/2008 | Murayama et al. ............. | 701/54 |
| 2010/0222973 A1 * | 9/2010 | Senda et al. .................... | 701/54 |
| 2012/0202647 A1 * | 8/2012 | Suzuki et al. ................... | 477/77 |
| 2013/0096789 A1 * | 4/2013 | McDonnell et al. ............ | 701/54 |

* cited by examiner

*Primary Examiner* — Edwin A Young
(74) *Attorney, Agent, or Firm* — Quinn Law Group, PLLC

(57) ABSTRACT

A method for controlling a powertrain includes the following steps: (a) determining whether a vehicle is coasting to a stop based on an accelerator pedal position; (b) determining whether an automatic transmission is in first gear; (c) shifting an input clutch from an engaged state to a disengaged state in order to operatively disconnect the automatic transmission from an internal combustion engine if the vehicle is coasting to a stop and the automatic transmission is not in first gear; and (d) shifting the automatic transmission to the first gear in order to allow the internal combustion engine to be shut down while the vehicle is coasting to a stop.

20 Claims, 3 Drawing Sheets

METHOD FOR CONTROLLING A POWERTRAIN AND A TRANSMISSION SYSTEM

TECHNICAL FIELD

The present disclosure relates to a method for controlling a powertrain and a transmission system.

BACKGROUND

Motor vehicles, such as cars, include a powertrain configured to generate power. The powertrain includes an internal combustion engine and a transmission system. The transmission system includes a transmission for transferring torque from the internal combustion engine to the wheels of the vehicle. Some vehicles include an automatic transmission capable of automatically shifting gears.

SUMMARY

The present disclosure relates to a transmission system and a method for controlling a powertrain. Specifically, the presently disclosed transmission system and method are designed to be used in a vehicle employing start-stop technology for minimizing fuel consumption. The term "start-stop technology" refers to a technology for automatically shutting down an internal combustion engine when the vehicle is at rest, such as at a traffic light, and automatically restarting the internal combustion engine when the vehicle operator requests additional torque by, for example, depressing an accelerator pedal or releasing a brake pedal.

By using the method and transmission system described herein, the internal combustion engine of a vehicle can be automatically shut down while the vehicle is coasting to a stop. As used herein, the term "coasting" means moving along without the application of propulsive power (as by momentum or gravity). For example, a vehicle coasts when it is moving while the vehicle operator is not applying the accelerator pedal. To automatically shut down the internal combustion engine, the automatic transmission should be in the first gear. Therefore, vehicles employing the start-stop technology typically shut down the engine once the vehicle is at rest. It would be useful, however, to automatically shut down the engine while the vehicle is coasting to a stop. To do so, the automatic transmission of the vehicle should be shifted to the first gear while the vehicle is coasting to a stop. It is therefore useful to develop a powertrain control method that allows the automatic transmission to be shifted to the first gear, thereby allowing the internal combustion engine to be shut down while the vehicle is coasting to a stop.

The present disclosure relates to a method for controlling a powertrain. In an embodiment, the method includes following steps: (a) determining whether a vehicle is coasting to a stop based on an accelerator pedal position; (b) determining whether an automatic transmission is in first gear; (c) shifting an input clutch from an engaged state to a disengaged state in order to operatively disconnect the automatic transmission from an internal combustion engine if the vehicle is coasting to a stop and the automatic transmission is not in first gear; and (d) shifting the automatic transmission to the first gear in order to allow the internal combustion engine to be shut down while the vehicle is coasting to a stop.

The present disclosure also relates to a transmission system. In an embodiment, the transmission system an automatic transmission including an input clutch. The input clutch has an engaged state and a disengaged state. In the engaged state, the input clutch operatively connects the automatic transmission to an internal combustion engine. In the disengaged state, the input clutch operatively disconnects the automatic transmission from the internal combustion engine. The transmission system further includes a transmission control module in electric communication with the automatic transmission. The transmission control module is configured and programmed to perform the following functions: (a) determine whether a vehicle is coasting to a stop based on an accelerator pedal position; (b) determine whether the automatic transmission is in first gear; (c) send a clutch command to the automatic transmission in order to shift the input clutch from the engaged state to the disengaged state; and (d) send a shift command to the automatic transmission in order to shift the automatic transmission to first gear after shifting the input clutch to the disengaged state in order to allow the internal combustion engine to be shut down while the vehicle is coasting to a stop.

The present disclosure also relates to a vehicle such as a car or a truck. In an embodiment, the vehicle, an internal combustion engine, and an engine control module are in electronic communication with the internal combustion engine. The vehicle further includes an accelerator pedal operatively coupled to the internal combustion engine and an accelerator pedal sensor operatively coupled to the accelerator pedal. The accelerator pedal sensor can determine an accelerator pedal position. The vehicle additionally includes an automatic transmission having an input clutch. The input clutch has an engaged state and a disengaged state. In the engaged state, the input clutch operatively connects the automatic transmission to the internal combustion engine. In the disengaged state, the input clutch operatively disconnects the automatic transmission from the internal combustion engine. The vehicle further includes a transmission control module in electric communication with the automatic transmission and the engine control module. The transmission control module is configured and programmed to perform the following functions: (a) determine whether the vehicle is coasting to a stop based on the accelerator pedal position; (b) determine whether the automatic transmission is in first gear; (c) send a clutch command to the automatic transmission in order to shift the input clutch from the engaged state to the disengaged state; (d) send a shift command to the automatic transmission in order to shift the automatic transmission to first gear after shifting the input clutch to the disengaged state; and (e) send a deactivation command to the engine control module. The engine control module is configured and programmed to shut down the internal combustion engine while the vehicle is coasting upon receipt of the deactivation command from the transmission control module.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
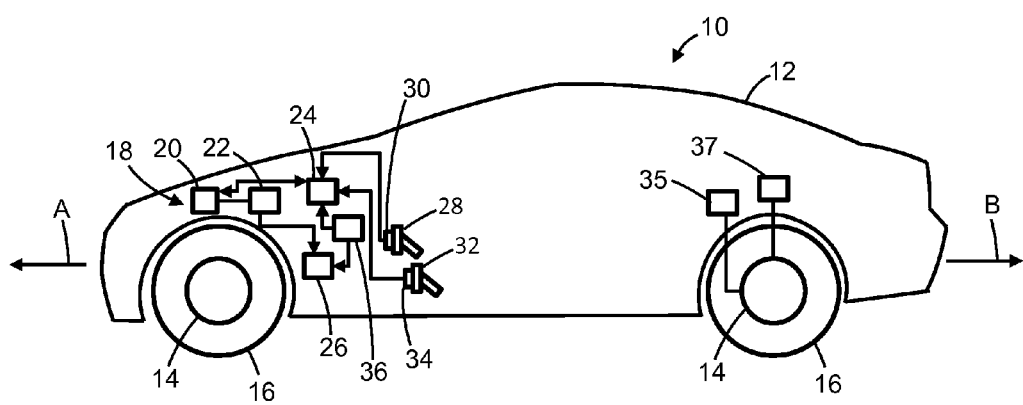
FIG. 1 is a schematic side view of a vehicle in accordance with an embodiment of the present disclosure.

Referring to the drawings, wherein like reference numbers correspond to like or similar components throughout the several figures, FIG. 1 is a schematic of a vehicle 10 such as a car or a truck. The vehicle 10 includes a vehicle body 12 and wheels 14 operatively coupled to the vehicle body 12. Each wheel 14 is operatively coupled to a tire 16.

The vehicle 10 further includes a powertrain 18 including an internal combustion engine 20 and an automatic transmission 22 operatively couple to the internal combustion engine 20. The internal combustion engine 20 can drive the wheels 14, thereby propelling the vehicle 10. The automatic transmission 22 is operatively coupled to the internal combustion engine 20 and the wheels 14. Accordingly, the automatic transmission 22 can transfer torque from the internal combustion engine 20 to the wheels 14.

The vehicle 10 includes an engine control module (ECM) 24 in communication with the internal combustion engine 20. The ECM 24 may be, for example, in electronic communication with the internal combustion engine 20. As such, the ECM 24 can control the operation of the internal combustion engine 20. "Control module," "module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed based on events or at regular intervals.

In the vehicle 10, the ECM 24 can automatically shut down and restart the internal combustion engine 20 to minimize the amount of time the engine 20 spends idling. For example, if the vehicle 10 stops at a traffic light, the ECM 24 can automatically shut down the internal combustion engine 20. When the traffic light turns green and the vehicle operator requests additional torque by pressing the accelerator pedal 28, the ECM 24 can automatically start the internal combustion engine 20. The vehicle 10 therefore employs a start-stop technology. As discussed above, the term "start-stop technology" refers to a system capable of automatically shutting down an internal combustion engine when the vehicle is at rest, such as at a traffic light, and automatically restarting the internal combustion engine when the vehicle operator requests additional torque by, for example, depressing an accelerator pedal or releasing a brake pedal.

The vehicle 10 further includes a transmission control module (TCM) 26 in communication with the automatic transmission 24. For example, the TCM 26 may be in electronic communication with the automatic transmission 24. As such, the TCM 26 can control the operation of the automatic transmission 22. The TCM 26 may also be in electronic communication with the ECM 24.

The vehicle 10 further includes an accelerator pedal 28 that enables a vehicle operator to adjust the position of a throttle (not shown) of the internal combustion engine 20 to achieve a desired speed. The vehicle 10 further includes an accelerator pedal position sensor 30 capable of generating an accelerator pedal position signal indicating the position of the accelerator pedal 28. The accelerator pedal position sensor 30 can be in electronic communication with the ECM 24, TCM 26, or both. The ECM 24 can receive the accelerator pedal position signal from the accelerator pedal position sensor 30 and can adjust the position of the throttle (not shown) of the internal combustion engine 20 accordingly, which in turn adjusts the fuel delivery to the internal combustion engine 20.

The vehicle 10 further includes a brake pedal 32 that enables a vehicle operator to adjust the position of the brakes (not shown) in order to reduce the speed of the vehicle 10. Further, the vehicle 10 includes a brake pedal position sensor 34 capable of generating a brake pedal position signal indicating the position of the brake pedal 32. The brake pedal position sensor 34 can be in electronic communication with the ECM 24, TCM 26, or both. For example, the brake pedal position sensor 34 can send a signal to the ECM 24 or the TCM 26, indicating that the brake pedal 32 has not been applied.

The vehicle 10 may be a hybrid electric vehicle. As such, the vehicle 10 may include at least one electric motor-generator 37 operatively coupled to at least one of the wheels 16. The electric motor-generator 37 can drive the wheels 16 in order to propel the vehicle 10.

The vehicle 10 may include an energy storage device 36, such as one or more batteries, electrically connected to the TCM 26, ECM 24, and electric motor-generator 37. The energy storage device 36 provides electrical energy to the TCM 26, ECM 24, electric motor-generator 37, and internal combustion engine 20.

Instead of a hybrid electric vehicle, the vehicle 10 may be a microhybrid vehicle. As used herein, the term "microhybrid vehicle" refers to vehicles capable of automatically starting and shutting an internal combustion engine but that do not rely on an electric motor for propulsion. Microhybrid vehicles employ a battery to keep the air condition system, radio, and other electronic components of the vehicle running while the engine is not running as well as to start the engine when the vehicle operator requests additional torque by, for example, applying the accelerator pedal. The vehicle 10 may be a microhybrid vehicle and therefore rely on the energy storage device 36 to keep running electronic components while the engine is shut down. The energy storage device 36 can be used to kick-start the internal combustion engine 20 when the vehicle operator requests additional torque by depressing the accelerator pedal 28 after the stop.

The vehicle 10 further include a vehicle speed sensor 35 configured to measure vehicle speed and generate a speed signal indicative of the vehicle speed. The vehicle speed sensor 35 may be operatively coupled to the wheel 14 via an axle (not shown) in order to measure the rotary speed of the wheel 14. The TCM 26, ECM 24, or both may be in electronic communication with the vehicle speed sensor 35. Accordingly, the TCM 26 and ECM 24 can determine the vehicle speed based on signals received from the vehicle speed sensor 35.

Figure 2:
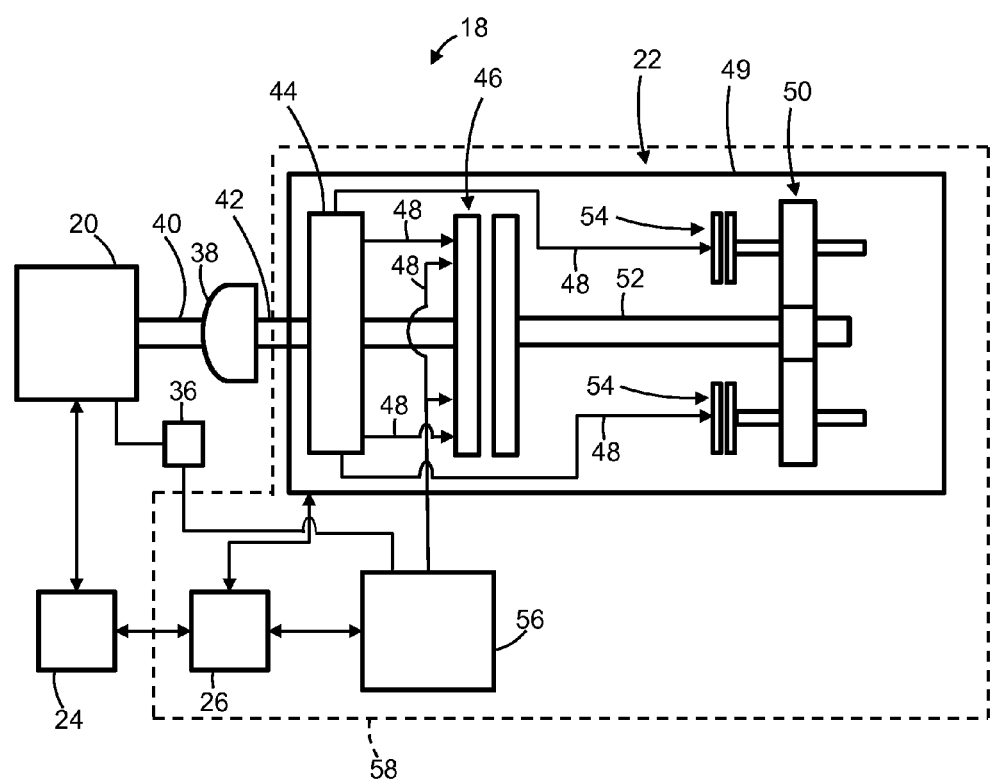
FIG. 2 is a schematic block diagram of a powertrain of the vehicle shown in FIG. 1.

With reference to FIG. 2, the powertrain 18 includes the internal combustion engine 20, the automatic transmission 22, and a torque converter 38 coupling the internal combustion engine 20 to the automatic transmission 22. The torque convertor 38 allows the internal combustion engine 20 to remain running while the vehicle 10 is stationary, without stalling. The internal combustion engine 20 includes an output member 40, such as an output shaft, operatively coupled to the torque converter 38.

The automatic transmission 22 includes an input member 42, such as an input shaft, operatively coupled to the torque converter 38. Moreover, the automatic transmission 22 includes a transmission housing 49 and an internal hydraulic pump 44 at least partially disposed within the transmission housing 49. The internal hydraulic pump 44 may be a gear pump and can draw automatic transmission fluid 48, such as oil, from a sump (not shown) and pressurize the automatic transmission fluid 48. Further, the internal hydraulic pump 44 may also be referred to as the first pump and can supply the automatic transmission fluid 48 to other components of the automatic transmission 22. In the depicted embodiment, the internal hydraulic pump 44 is operatively coupled to the torque converter 38 and therefore can pressurize the automatic transmission fluid 48 whenever the internal combustion engine 20 is running. The internal hydraulic pump 44 may be referred to as the first pump, first pressure source, and internal pump. It is envisioned that the internal hydraulic pump 44 may be substituted for any other suitable pressure source. Accordingly, the reference number 44 may identify a pressure source, which may be referred to as a first pressure source.

The automatic transmission 22 further includes an input hydraulic clutch 46 in fluid communication with the internal hydraulic pump 44. As such, the input clutch 46 can receive automatic transmission fluid 48 from the internal hydraulic pump 44. Upon receipt of sufficient automatic transmission fluid 48, the input hydraulic clutch 46 shifts from a disengaged state to an engaged state. In the disengaged state, the input hydraulic clutch 46 does not transfer torque from the internal combustion engine 20. In the engaged state, the input hydraulic clutch 46 can transfer torque from the internal combustion engine 20. The input hydraulic clutch 46 may be operatively coupled to the input shaft 44 and may be referred to as an input clutch or a first clutch.

The automatic transmission 22 further includes at least one planetary gear set 50 operatively coupled to the input hydraulic clutch 46. A coupler 52, such as a coupling shaft, can operatively couple the planetary gear set 50 to the input hydraulic clutch 46. In the engaged state, the input hydraulic clutch 46 can transfer torque from the input member 42 to the planetary gear set 50 via the coupler 52. In the disengaged state, the input hydraulic clutch 46 does not transfer torque from the input member 42 to the planetary gear set 50.

In addition to the planetary gear set 50, the automatic transmission 22 includes a plurality of gear clutches 54 disposed in fluid communication with the internal hydraulic pump 44. Each gear clutch 54 can shift between an engaged state and a disengaged state. In the disengaged state, the gear clutch 54 does not transfer torque, whereas, in the engaged state, the gear clutch 54 transfers torque. To shift each gear clutch 52 from the disengaged state to the engaged state, the gear clutch 52 can receive automatic transmission fluid 48 from the internal hydraulic pump 44. Upon receipt of a sufficient automatic transmission fluid 48, the gear clutch 54 shifts from the disengaged state to the engaged state. The gear clutches 54 can be engaged or disengaged to select different speed ratios in the automatic transmission 22. As used herein, the term "speed ratio" means the ratio of the engine speed to the transmission output speed.

The vehicle 10 further includes an external hydraulic pump 56 in fluid communication with the automatic transmission 22. Specifically, the external hydraulic pump 56 is in fluid communication with the input hydraulic clutch 46. The external hydraulic pump 56 may be disposed outside the transmission housing 48 and may be referred to as the second hydraulic pump or second pump. It is envisioned that the external hydraulic pump 56 may be substituted for any other suitable pressure source. Accordingly, reference number 56 may identify a suitable pressure source. The energy storage device 36 is electrically connected to the external hydraulic pump 56. As such, the external hydraulic pump 56 can operate independently of the internal combustion engine 12. In other words, the external hydraulic pump 56 can receive electrical energy from the energy storage device 36 and can therefore operate regardless of whether the internal combustion engine 20 is running. In operation, the external hydraulic pump 56 can draw automatic transmission fluid 48 from a sump (not shown) and deliver the automatic transmission fluid 48 to the input hydraulic clutch 46 and other components of the automatic transmission 22 for lubrication purposes even if the internal combustion engine 20 is shut down. The external hydraulic pump 56, TCM 26, and automatic transmission 22 may be collectively referred to as a transmission system 58. The transmission system 58 may also include the energy storage device 36.

Figure 3:
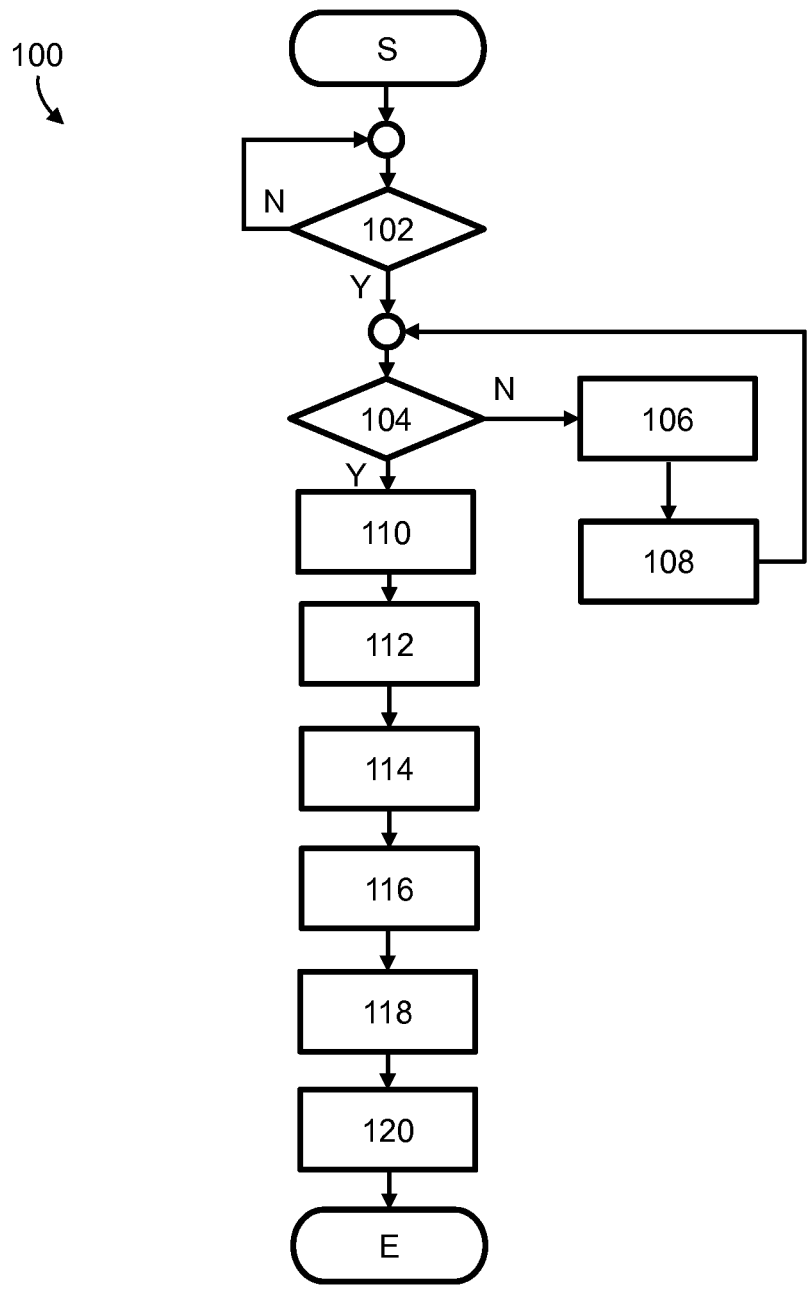
FIG. 3 is a flowchart illustrating a method of controlling an automatic transmission of the vehicle shown in FIG. 1.

FIG. 3 includes a flowchart of a method 100 for controlling the powertrain 18. By using the method 100, the internal combustion engine 20 can be automatically shut down while the vehicle 10 is coasting to a stop. As discussed above, the term "coasting" means moving along without the application of propulsive power (as by momentum or gravity). For example, the vehicle 10 coasts when it is moving while the vehicle operator is not applying the accelerator pedal 28. To automatically shut down the internal combustion engine 20, the automatic transmission 22 should be in the first gear. The method 100 can control the transmission system 58 to shift the automatic transmission 22 to the first gear and shut down the internal combustion engine 20 while the vehicle 10 is coasting to a stop.

The method 100 begins at block S and proceeds to step 102. Step 102 entails determining whether the vehicle 10 is coasting to a stop based on the position of the accelerator pedal 28 (i.e., the accelerator pedal position). The TCM 26 can determine if the vehicle 10 is coasting to a stop based on the position of the accelerator pedal 28, the position of the brake pedal 32, or both. Specifically, the TCM 26 can determine that the vehicle 10 is coasting to a stop when the accelerator pedal 28 is in a predetermined position (e.g., a position where the accelerator pedal 28 is not applied or actuated) for a predetermined period of time (e.g., about 5 seconds). Also, the TCM 26 can determine that the vehicle 10 is coasting to a stop when the accelerator pedal 28 is in a predetermined position for a predetermined period of time and the brake pedal 32 is in a predetermined position for a predetermined period of time. Further, the TCM 26 may refrain from determining that the vehicle 10 is coasting to a stop if the vehicle 10 is not moving. Thus, step 102 may entail determining whether the vehicle 10 is coasting to a stop based, in part, on the vehicle speed. The TCM 26 may determine the vehicle speed based on a vehicle speed signal from the vehicle speed sensor 35. Alternatively, the TCM 26 may determine whether the vehicle 10 is moving based on a transmission output speed (TOS) signal from a TOS sensor (not shown). If the TOS or the vehicle speed is about zero, the TCM 26 then determines that the vehicle 10 is not coasting to a stop. In summary, step 102 entails determining, via the TCM 26, whether the vehicle 10 is coasting and includes at least one of the following sub-steps: (a) determining a position of the accelerator pedal 28 (i.e., the accelerator pedal position) based on an accelerator pedal position signal from the accelerator pedal position sensor 30; (b) determining a position of the brake pedal 32 based on a brake pedal position signal from the brake pedal position sensor 34; and (c) determining whether the vehicle 10 is moving based on a speed signal from the vehicle speed sensor 35 or a TOS sensor (not shown). If the TCM 26 determines that the vehicle 10 is not coasting to a stop, the method 100 starts again. On the other hand, if the TCM 26 determines that the vehicle 10 is coasting to a stop, then the method 100 proceeds to step 104.

Step 104 entails determining whether the automatic transmission 22 is in first gear. Each gear of the automatic transmission 22 corresponds to a speed ratio of the engine speed to the transmission output speed. Thus, as used herein, the term "speed ratio" means the ratio of the engine speed to the transmission output speed. The first gear of the automatic transmission 22 corresponds to the largest speed ratio of the automatic transmission 22 that allows the vehicle 10 to move forward. In step 104, the TCM 26 determines whether the automatic transmission is in first gear. Because the first gear corresponds to the first speed ratio, the TCM 26 determines whether the automatic transmission 22 is operating at the first speed ratio, which corresponds to the largest speed ratio of the automatic transmission 22 that allows the vehicle to move forward. In FIG. 1, the forward direction is indicated by arrow A, whereas the backwards direction is indicated by arrow B. If the automatic transmission 22 is not in first gear, then the method 100 proceeds to step 106.

Step 106 entails shifting the input hydraulic clutch 46 (or any other input clutch) from the engaged state to the disengaged state in order to operatively disconnect the automatic transmission 22 from the internal combustion engine 20. As a consequence, torque cannot be transferred from the internal combustion engine 20 to the automatic transmission 22. To shift the input hydraulic clutch 46 to the disengaged state, the TCM 26 can send a clutch command (e.g., disengaged clutch command) to the automatic transmission 22 in order to shift the input hydraulic clutch 46 from engaged state to the disengaged state. In summary, step 106 entails shifting the input hydraulic clutch 46 from the engaged state to the disengaged state in order to operatively disconnect the automatic transmission 22 from the internal combustion engine 20 only if the vehicle 10 is coasting to a stop and the automatic transmission 22 is not in first gear. Next, the method 100 continues to step 108

Step 108 entails shifting the automatic transmission 22 from the current gear to the first gear in order to allow the internal combustion engine 20 to be shut down while the vehicle 10 is coasting to a stop. To do so, the TCM 26 can send a shift command to the automatic transmission 22 in order to shift to the first gear after shifting the input hydraulic clutch 46 to the disengaged state in order to allow the internal combustion engine 20 to be shut down while the vehicle 10 is coasting to a stop. Next, the method 100 returns to step 104.

As discussed above, in step 104, the TCM 26 determines if the automatic transmission 22 is in first gear. If the automatic transmission 22 is in the first gear, then the method 100 continues to step 110.

Step 110 entails shutting down the internal combustion engine 20 after shifting the automatic transmission 22 to first gear. To do so, the TCM 26 can send a deactivation command to the ECM 24, which in turn sends a corresponding deactivation command to the internal combustion engine 20, thereby shutting down the internal combustion engine 20 while the vehicle 10 is coasting to a stop. In step 110, the TCM 26 can send a deactivation command to the internal combustion engine 20 via the ECM 24 to stop the internal combustion engine 20 while the vehicle 10 is coasting to a stop. Next, the method 100 continues to step 112.

Step 112 entails turning on the external hydraulic pump 56 in order to supply automatic transmission fluid 48 to one or more components of the automatic transmission 22 such as the input hydraulic clutch 46 for lubrication purposes. At this point, the internal hydraulic pump 44 is not running because it is driven by the internal combustion engine 20, which is shut down. It is therefore useful to provide automatic transmission fluid 48 to the automatic transmission 22 for lubrication purposes. As discussed above, the external hydraulic pump 56 is turned on while the internal combustion engine 20 is stopped. To turn on or activate the external hydraulic pump 56, the TCM 26 can send an activation signal to the external hydraulic pump 56. In response to this activation signal, the external hydraulic pump 56 turns on. Thus, step 112 entails activating a pump (e.g., the external hydraulic pump 56) in order to supply automatic transmission fluid 48 to the automatic transmission 22. This pump (e.g., the external hydraulic pump 56) is configured to operate independently of the internal combustion engine 20. The method 100 then continues to step 114.

Step 114 entails receiving a request for the internal combustion engine 20 to be started for generating a level of transmission output torque while the vehicle 10 is coasting to a stop or at rest. Specifically, the vehicle operator may request the ECM 24 to start the internal combustion engine 20 by, for example, depressing the accelerator pedal 28. Upon receipt of this request from the vehicle operator, ECM 24 may command the internal combustion engine 20 to start in order to generate a level of transmission output torque that corresponds to the position of the accelerator pedal 28. Then, the method 100 continues to step 116.

Step 116 entails deactivating the pump (e.g., external hydraulic pump 56) supplying automatic transmission fluid 48 to the automatic transmission 22. As stated above, this pump (e.g., external hydraulic pump 56) operates independently of the internal combustion engine 20. At step 116, the TCM 26 sends a deactivation signal to the external hydraulic pump 56, thereby turning off the external hydraulic pump 56. Next, the method 100 continues to step 118.

Step 118 entails determining a speed ratio in the automatic transmission 22 according to the level of transmission output torque requested by the vehicle operator. In particular, the TCM 26 can determine an engine speed and a speed ratio in the automatic transmission 22 according to the level of transmission output torque requested by the vehicle operator. For example, the engine speed and the speed ratio in the transmission 22 may be selected from a table of mapped data that was gathered during testing and development of the vehicle 10. After determining the appropriate speed ratio in the automatic transmission 22, the TCM 26 can send a shift command to the automatic transmission 22 in order to shift the automatic transmission 22 to the gear (e.g., second gear) that corresponds to the appropriate speed ratio. In response to the shift command, the automatic transmission 22 shifts to the appropriate gear. Step 118 therefore includes shifting the automatic transmission 22 to another gear (i.e., other than the first gear) based on the determined speed ratio. After shifting the automatic transmission 22 to the gear that corresponds to the appropriate speed ratio, the method 100 continues to step 120.

Step 120 entails shifting the input hydraulic clutch 46 (or any other input clutch) from the disengaged state to engaged state in order to operatively couple the internal combustion engine 20 to the automatic transmission 22. In the engaged state, the input hydraulic clutch 46 can transfer torque from the internal combustion engine 20 to the automatic transmission 22. At step 120, the TCM 26 can send a clutch command (e.g., engage clutch command) to the automatic transmission 22 in order to shift the input hydraulic clutch from the disengaged state to the engaged state. After step 120, the method 100 ends at block E.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method comprising:
   determining whether a vehicle is coasting to a stop based on an accelerator pedal position, wherein the vehicle includes an automatic transmission and an internal combustion engine operatively coupled to the automatic transmission, the automatic transmission including an input clutch;
   determining whether the automatic transmission is in first gear;
   shifting the input clutch from an engaged state to a disengaged state in order to operatively disconnect the automatic transmission from the internal combustion engine if the vehicle is coasting to a stop and the automatic transmission is not in first gear; and
   shifting the automatic transmission to the first gear in order to allow the internal combustion engine to be shut down while the vehicle is coasting to a stop.

2. The method of claim 1, further comprising shutting down the internal combustion engine after shifting the automatic transmission to the first gear.

3. The method of claim 2, further comprising activating a pump in order to supply automatic transmission fluid to the automatic transmission, wherein the external pump is configured to operate independently of the internal combustion engine.

4. The method of claim 3, further comprising receiving a request for the internal combustion engine to be started for generating a level of transmission output torque.

5. The method of claim 4, further comprising starting the internal combustion engine in response to the request.

6. The method of claim 5, further comprising deactivating the pump after starting the internal combustion engine.

7. The method of claim 6, further comprising determining a speed ratio based on the level of transmission output torque.

8. The method of claim 7, further comprising shifting the automatic transmission to another gear that corresponds to the determined speed ratio.

9. The method of claim 8, further comprising shifting the input clutch from the disengaged state to the engaged state in order to operatively couple the internal combustion engine to the automatic transmission.

10. A transmission system comprising:
    an automatic transmission including an input clutch, the input clutch having an engaged state and a disengaged state, wherein the input clutch is configured to operatively connect the automatic transmission to an internal combustion engine in the engaged state, and the input clutch is configured to operatively disconnect the automatic transmission from the internal combustion engine in the disengaged state;
    a transmission control module in electric communication with the automatic transmission, the transmission control module being programmed to:
       determine whether a vehicle is coasting to a stop based on an accelerator pedal position;
       determine whether the automatic transmission is in first gear;
       send a clutch command to the automatic transmission in order to shift the input clutch from the engaged state to the disengaged state; and
       send a shift command to the automatic transmission in order to shift the automatic transmission to first gear after shifting the input clutch to the disengaged state in order to allow the internal combustion engine to be shut down while the vehicle is coasting to a stop.

11. The transmission system of claim 10, wherein the transmission control module is programmed to send a deactivation command to an engine control module in order to shut down the internal combustion engine after shifting the automatic transmission to first gear.

12. The transmission system of claim 11, further comprising a pump in fluid communication with the automatic transmission, the pump being configured to operate independently of the internal combustion engine, and wherein the transmission control module is programmed to send an activation signal to the pump in order to turn on the pump to supply automatic transmission fluid to the automatic transmission.

13. A vehicle comprising:
    an internal combustion engine;
    an engine control module in electronic communication with the internal combustion engine;
    an accelerator pedal operatively coupled to the internal combustion engine;
    an accelerator pedal sensor operatively coupled to the accelerator pedal, the accelerator pedal sensor being configured to determine an accelerator pedal position;
    an automatic transmission including an input clutch, the input clutch having an engaged state and a disengaged state, wherein the input clutch is configured to operatively connect the automatic transmission to the internal combustion engine in the engaged state, and the input clutch is configured to operatively disconnect the automatic transmission from the internal combustion engine in the disengaged state; and
    a transmission control module in electric communication with the automatic transmission and the engine control module, the transmission control module being programmed to:
       determine whether the vehicle is coasting to a stop based on the accelerator pedal position;
       determine whether the automatic transmission is in first gear;
       send a clutch command to the automatic transmission in order to shift the input clutch from the engaged state to the disengaged state;
       send a shift command to the automatic transmission in order to shift the automatic transmission to first gear after shifting the input clutch to the disengaged state; and
       send a deactivation command to the engine control module; and
    wherein the engine control module is programmed to shut down the internal combustion engine while the vehicle is coasting upon receipt of the deactivation command from the transmission control module.

14. The vehicle of claim 13, further comprising a pump in fluid communication with the automatic transmission, the pump being configured to operate independently of the internal combustion engine, and wherein the transmission control module is programmed to send an activation signal to the pump in order to turn on the pump to supply automatic transmission fluid to the automatic transmission.

15. The vehicle of claim 14, wherein the engine control module is programmed to receive a request for the internal combustion engine to be started for generating a level of transmission output torque.

16. The vehicle of claim 15, wherein the engine control module is programmed to start the internal combustion engine in response to the request.

17. The vehicle of claim 16, wherein the transmission control module is programmed to send a deactivation signal to the pump in order to deactivate the pump.

18. The vehicle of claim 17, wherein the transmission control module is programmed to determine a speed ratio based on the level of transmission output torque.

19. The vehicle of claim 18, wherein the transmission control module is programmed to command the automatic transmission to shift to another gear that corresponds to the determined speed ratio.

20. The vehicle of claim 19, wherein the transmission control module is programmed to command the input clutch to shift from the disengaged state to the engaged state in order to operatively couple the internal combustion engine to the automatic transmission.

* * * * *